(12) United States Patent
DeVito et al.

(10) Patent No.: US 11,730,319 B2
(45) Date of Patent: *Aug. 22, 2023

(54) SIFTER SCALE ATTACHMENT FOR STAND MIXER

(71) Applicant: WHIRLPOOL CORPORATION, Benton Harbor, MI (US)

(72) Inventors: Lucas DeVito, Byron Center, MI (US); Peter Lund, St. Joseph, MI (US); Nicholas Schutte, St. Joseph, MI (US); Joseph Snyder, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,606

(22) Filed: Mar. 28, 2022

(65) Prior Publication Data

US 2022/0211216 A1    Jul. 7, 2022

Related U.S. Application Data

(63) Continuation of application No. 17/061,896, filed on Oct. 2, 2020, now Pat. No. 11,291,337, which is a
(Continued)

(51) Int. Cl.
*A47J 43/22* (2006.01)
*A47J 43/06* (2006.01)
(Continued)

(52) U.S. Cl.
CPC ............... *A47J 43/22* (2013.01); *A47J 43/06* (2013.01); *A47J 43/07* (2013.01); *A47J 43/0705* (2013.01);
(Continued)

(58) Field of Classification Search
CPC .... G01G 19/24; B07B 1/06; A47J 2043/0733; A47J 43/22; A47J 43/0705; A47J 43/07; A47J 43/06
See application file for complete search history.

(56) References Cited

U.S. PATENT DOCUMENTS

| 2,074,162 A | 3/1937 | Bowman |
| 2,537,852 A | 1/1951 | Peterson |

(Continued)

FOREIGN PATENT DOCUMENTS

| CN | 202603529 U | 12/2012 |
| EP | 2042066 A1 | 4/2009 |

(Continued)

*Primary Examiner* — Patrick H Mackey
(74) *Attorney, Agent, or Firm* — Price Heneveld LLP (57) ABSTRACT

A food-product handling device includes a sifter unit having a housing defining an open upper side, a mount extending outwardly from the first housing along a first axis, and a lower side opposite the upper side. The sifter unit further has a sifter basket having an interior aligned with and inset within the open upper side. The device further includes a scale assembly having a body defining an upper opening and an opposite lower opening and having an annular weight-sensing unit surrounding the upper opening. The body is positionable on the housing of the sifter unit with the opening in communication with the open upper side of the housing. A hopper is positionable on the weight-sensing unit and defines a lower open end at least partially received within the body when the hopper is positioned on the weight-sensing unit.

20 Claims, 8 Drawing Sheets

Related U.S. Application Data continuation of application No. 16/243,412, filed on Jan. 9, 2019, now Pat. No. 10,827,881.

(60) Provisional application No. 62/627,958, filed on Feb. 8, 2018.

(51) Int. Cl.
*G01G 19/24* (2006.01)
*B07B 1/06* (2006.01)
*A47J 43/07* (2006.01)

(52) U.S. Cl.
CPC ............. *B07B 1/06* (2013.01); *G01G 19/24* (2013.01); *A47J 2043/0733* (2013.01)

(56) References Cited

U.S. PATENT DOCUMENTS

| | | | |
|---|---|---|---|
| 2,710,098 A * | 6/1955 | Tilton | A47J 44/02 209/358 |
| 5,174,403 A | 12/1992 | Geiger | |
| 5,721,000 A | 2/1998 | Center et al. | |
| 6,057,514 A * | 5/2000 | Maguire | B29B 7/283 366/76.1 |
| 6,659,633 B2 * | 12/2003 | Ancona | A47J 43/06 99/452 |
| 6,669,359 B1 * | 12/2003 | Ancona | A47J 43/06 99/452 |
| 6,886,972 B2 | 5/2005 | Buchsteiner | |
| 6,888,972 B2 | 5/2005 | Berg et al. | |
| 9,161,662 B2 | 10/2015 | Sladecek | |
| 9,782,041 B2 | 10/2017 | Baker | |
| 10,827,881 B2 * | 11/2020 | DeVito | A47J 43/22 |
| 11,291,337 B2 * | 4/2022 | DeVito | A47J 43/06 |
| 2003/0081498 A1 | 5/2003 | Buchsteiner | |
| 2010/0256804 A1 | 10/2010 | Freeman | |
| 2012/0286080 A1 | 11/2012 | Sladecek | |
| 2014/0102951 A1 | 4/2014 | Riha | |
| 2015/0014227 A1 | 1/2015 | Riha, IV | |
| 2015/0282672 A1 | 10/2015 | Baker | |
| 2019/0239696 A1 | 8/2019 | DeVito et al. | |
| 2022/0047120 A1 | 2/2022 | Dionisio | |

FOREIGN PATENT DOCUMENTS

| | | |
|---|---|---|
| WO | 2020148258 A1 | 7/2020 |
| WO | 2020161628 A1 | 8/2020 |
| WO | 2020161630 A1 | 8/2020 |

* cited by examiner

SIFTER SCALE ATTACHMENT FOR STAND MIXER

CROSS-REFERENCE TO RELATED APPLICATION

The present application is a continuation of and claims priority to U.S. patent application Ser. No. 17/061,896, now U.S. Pat. No. 11,291,337, filed on Oct. 2, 2020, which is a continuation of and claims priority to U.S. patent application Ser. No. 16/243,412, now U.S. Pat. No. 10,827,881, filed on Jan. 9, 2019, which claims the benefit under 35 U.S.C. § 119(e) of U.S. Provisional Patent Application No. 62/627,958, filed on Feb. 8, 2018, all of which are entitled "SIFTER SCALE ATTACHMENT FOR STAND MIXER," the entire disclosures of each are hereby incorporated herein by reference.

BACKGROUND

The present device generally relates to a combination sifter and scale assembly for use as an attachment for a mixer or similar appliance.

SUMMARY

In at least one aspect, a food-product handling device includes a housing defining an open upper side, a mount extending outwardly from a first housing along a first axis, and a lower side opposite the open upper side, a sifter basket having an interior aligned with and inset within the open upper side, at least one weight sensor operably supported on the housing over the open upper side of the housing, and a hopper defining a lower open end mountable over the housing with at least a portion of the lower open end bearing on the at least one weight sensor and with the lower open end in communication with the open upper side of the housing.

In at least another aspect, a food-product handling device includes a housing defining an open upper side, a mount extending outwardly from the housing along a first axis, and a lower side opposite the upper side, at least one weight sensor operably supported on the housing over the upper side of the housing, a hopper defining a lower open end mountable over the housing with at least a portion of the lower open end bearing on the at least one weight sensor and with the lower open end in communication with the open upper side of the housing, and a chute extending from the lower side of the housing, the chute defining a conduit from an interior of the housing to a location external to the housing.

In at least another aspect, a food product handling device includes a sifter-unit housing defining an open upper side, a lower side opposite the upper side, and a mount extending outwardly from the first housing along a first axis, the mount being configured to couple the device to a motor-driven mixing device and support the device on the motor-driven mixing device, a sifter basket having an interior aligned with and inset within the open upper side, and a sweeper crank unit mounted within the housing, having a first arm and a second arm, each generally following a contour of a cross-section of the sifter basket and being rotationally coupled with a fitting extending from the mount of the housing, the second arm being coupled with the first arm at the fitting, and the first and second arms extending angularly away from each other away from the fitting.

These and other features, advantages, and objects of the present device will be further understood and appreciated by those skilled in the art upon studying the following specification, claims, and appended drawings.

DETAILED DESCRIPTION OF EMBODIMENTS

Figure 1:
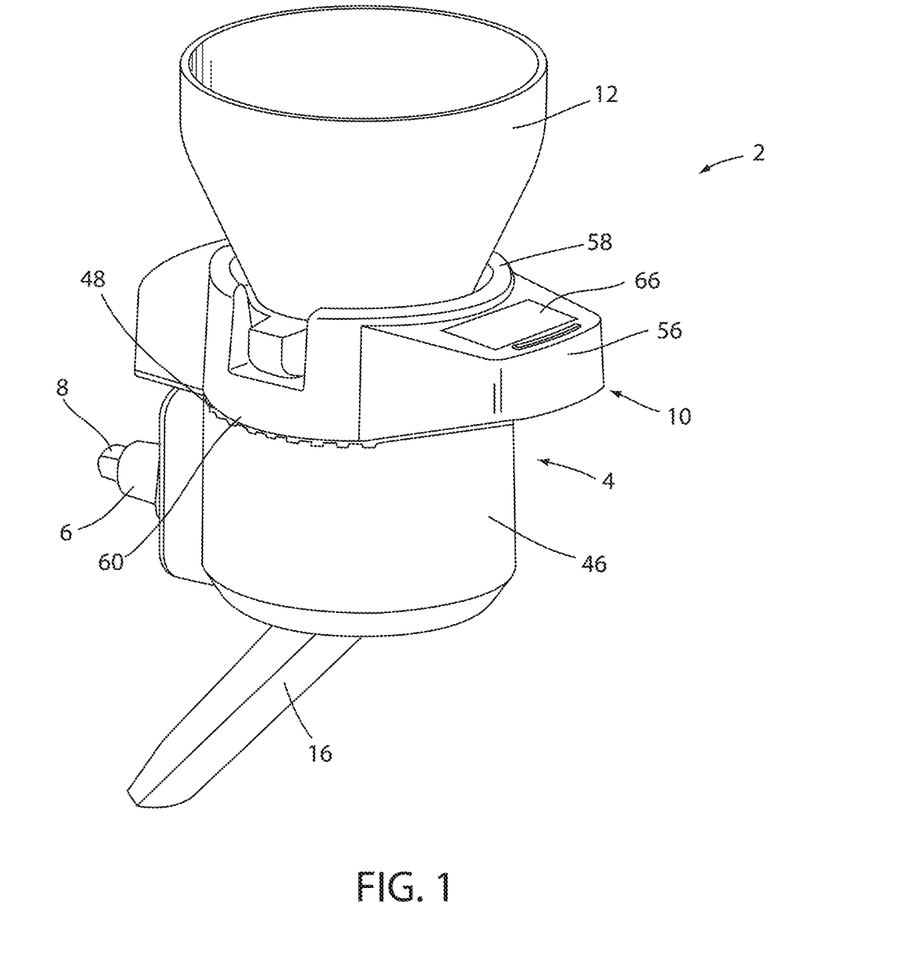
FIG. 1 is a front-perspective view of a combination sifter and scale device.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
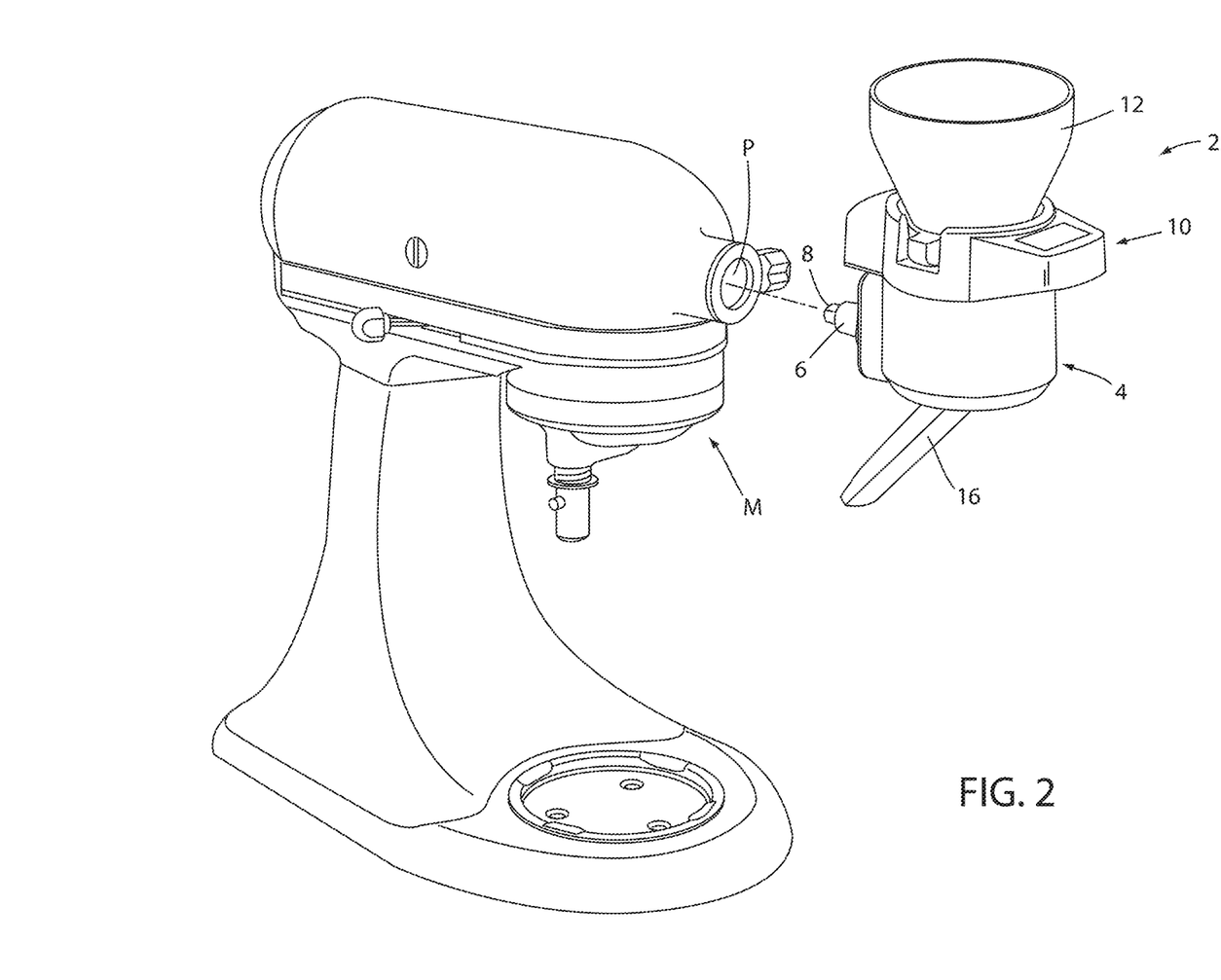
FIG. 2 is a front-perspective view of the device of FIG. 1 in an aligned condition with a stand mixer for attachment therewith.

Referring to the embodiment illustrated in FIGS. 1-4, reference numeral 2 generally designates a food-product handling device in the form of a combined sifter and scale attachment for a motor driven device such as the stand mixer M shown in FIG. 2. Device 2 includes a sifter unit 4 having a housing 46 defining an open upper side 48 and a lower side 50 opposite the upper side. The housing is further structured to define a mount portion 6 extending outwardly from the housing 46 along a first axis 52. The sifter unit 4 also includes a sifter basket 20 (FIG. 3) having an interior 54 (FIG. 3) aligned with and inset within the open upper side 48. Device 2 also includes a scale assembly 10 having a body 56 defining an upper opening 58 and an opposite lower opening 60 and having an annular weight-sensing unit 62 (FIG. 3) surrounding the upper opening 58. The body 56 of the scale assembly 10 is positionable on the housing 46 of the sifter unit 4 with the lower opening 60 in communication with the open upper side 48 of the housing 46 and a hopper 12 positionable on the weight-sensing unit 62.

With reference to FIGS. 1-4, the mount 6 of sifter portion 4 is receivable in the device connection port P of stand mixer M (FIG. 2). The mount 6 further includes an input shaft 8 that couples with a connection within the port P for driving operation of the sifter unit 4, as described further below. Scale portion 10 is positioned on the top of the main body 4 and supports a hopper 12 over the main body 4. In this manner, the entire device 2 is supported by the mixer M with hopper 12 open to and in communication with sifter screen 20 by way of alignment of the lower opening 60 of scale assembly 10 with the open upper side 48 of sifter portion 4. The above-mentioned sensor unit 62, which may include a plurality of sensors 14 (FIG. 3) arranged around a periphery of upper opening 58 of scale assembly 10, can be used to indicate the weight of ingredients added to the hopper 12 prior to sifting thereof. Device 2 also includes an output chute 16 arranged on and extending from the lower side 50 of sifter portion 4. As described further below, chute 16 can be configured to collect a food product passing through sifter basket 20 and to direct the sifted ingredients, including to a mixing bowl B (FIG. 4) positioned on mixer 4. In this manner, ingredients can be weighed, sifted, and added to mixing bowl B solely by device 2 for further mixing using stand mixer M or to another container adjacent mixer M but not coupled with or supported on mixer M.

Figure 3:
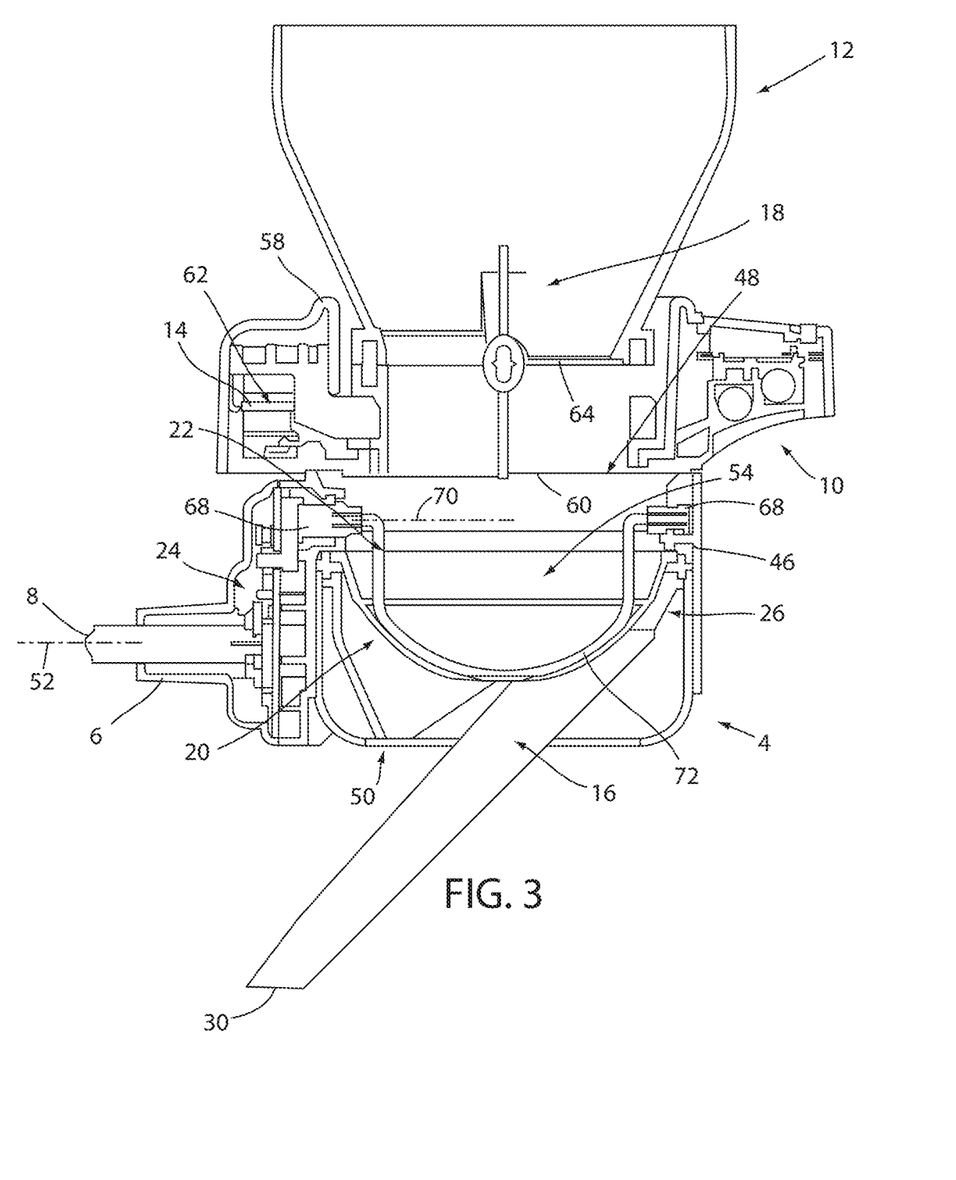
FIG. 3 is a side cross-section view of the device of FIG. 1.

As shown in FIG. 3, the lower end 64 of hopper 12 is open and at least partially received within the body 56 of scale portion 10 when the hopper 12 is positioned on the weight-sensing unit 62. In this manner, hopper 12 is supported in a desired position on body 56 with opening 64 aligned with lower opening 60 of body 56. As further shown, both the lower opening 60 of body 56 and the sifter screen 20 can be larger than the lower end 64 of hopper 12 so that ingredients exiting hopper 12 can fall out of body 56 and be collected by sifter screen 20. Hopper 12 has a butterfly valve 18 rotatably mounted within the lower open 64 end to selectively open and close the lower open end 64. In particular butterfly valve 18 can be controlled by a user by a knob coupled with butterfly valve 18 and externally positioned on device 2. In this manner, the hopper 12 may be closed as ingredients are added thereto so that they can be weighed as they accumulate in hopper 12. Subsequently, valve 18 can be selectively opened and closed so that the ingredients can be transferred to the sifter basket 20 in controlled amounts.

Continuing with respect to FIG. 3, sifter basket 20 is positioned below hopper 12 by being internally supported within main body 4. As is generally known, a majority of sifter basket 20 is defined by a mesh or perforated material with openings of a size sufficiently small to separate dry, powdered ingredients for improved mixing, such as with wet ingredients. A sweeper crank 22 is rotatably supported within main body 4 so as to rotate within the interior 54 space defined by screen 20 (where ingredients exiting hopper 12 collect) and to move closely to or in contact with the mesh or screen portion of sifter basket 20 during at least a portion of rotation to both break up any clumps within the ingredients and to urge the powdered ingredients released from hopper 12 through sifter basket 20. In the embodiment shown in FIG. 3, the sweeper crank 22 includes ends 68 supported on housing 46 so as to be rotatable about a second axis 70 parallel to the first axis 52. A central portion 72 of sweeper crank 22 is offset from ends 68 and forms a generally arcuate profile that generally matches the concave profile defined by sifter basket 20. As further shown, the sweeper crank 22 can have a generally circular cross-section and can define a relatively thin element of wire or the like.

The sweeper crank 22 is operably coupled with input shaft 8 by a reduction mechanism 24 such that the power coupling P of the mixer M (FIG. 3), which provides rotational movement, drives oscillation (or in some implementations, continuous rotation) of sweeper crank 22 (it is noted that the scale assembly 10 is powered by its own batteries, including for sensing unit 62 and the included display 66 and, accordingly, operates independently of the sifter).

Figure 4:
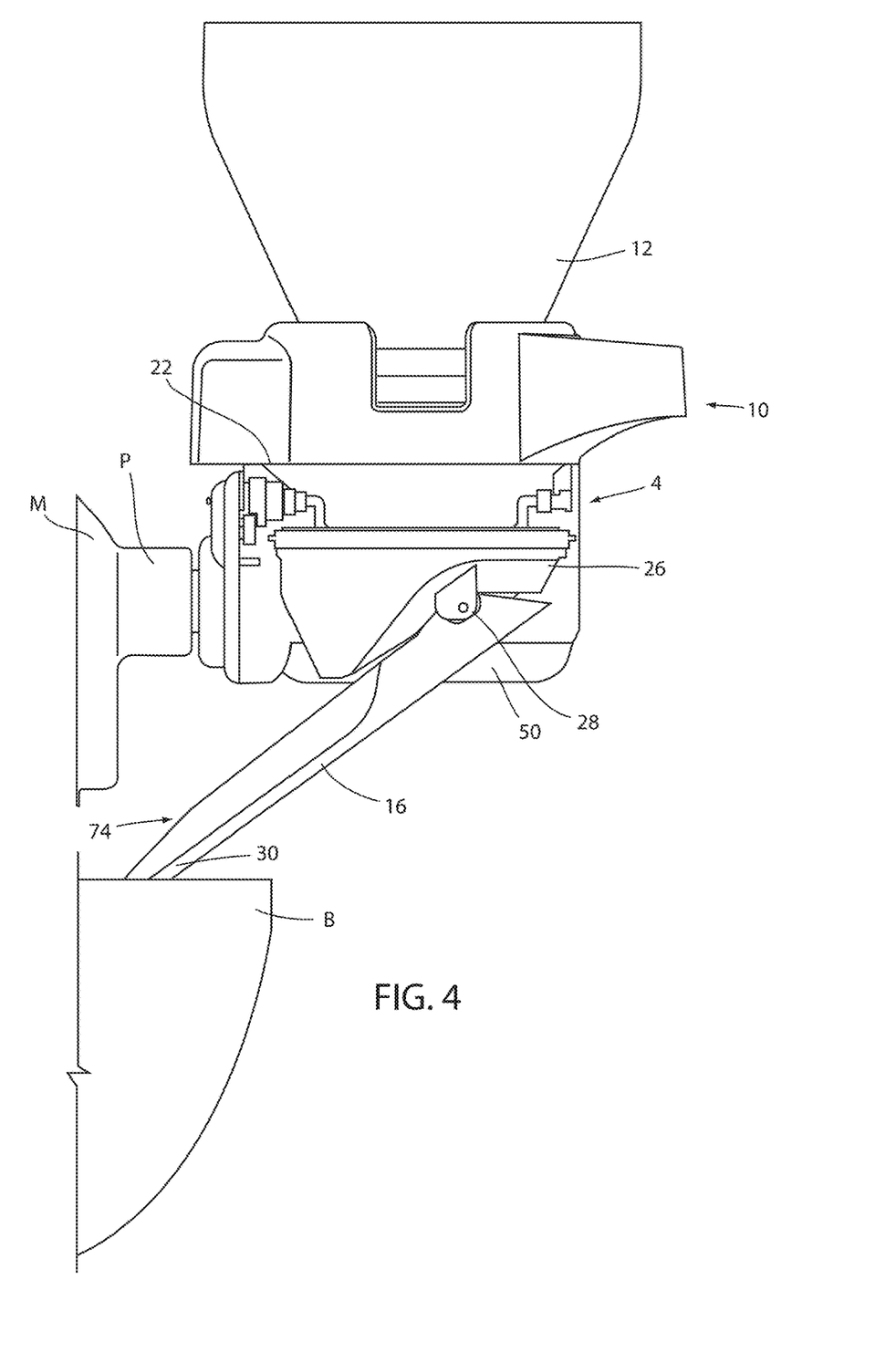
FIG. 4 is a partial sectional view of the device of FIG. 1 showing internal components thereof.

As shown in FIGS. 3 and 4, chute 16 extending from the lower side 50 of the housing 46 and defines a conduit 74 from the interior of the housing 46 below the sifter basket 20 to a location external to the housing 46. Chute 16 is coupled with the housing 46 of sifter unit 4 by a mounting unit 26 that is rotatably coupled within housing 4 and positioned beneath sifter basket 20. Mounting unit 26 allows for rotation of chute 16 along a plane parallel to the counter surface on which mixer M is positioned such that chute 16 can be directed into a mixing bowl B supported by the stand mixer M or positioned in another location adjacent to the mixer M. Mounting unit 26 also defines a generally conical shape that sifter basket 20 is set into. This shape allows mounting unit 26 to collect the sifted ingredients falling from sifter basket 20 and to direct them into the interior conduit 74 of chute 16. As shown in FIG. 4, chute 16 is also pivotally coupled with mounting unit 26 along a hinge 28 parallel to the counter to allow vertical rotation of chute 16 relative to housing 46. This rotation can allow chute 16 to be angled to accommodate bowls B or other receptacles of different heights and to facilitate movement into and out of the desired bowl B or receptacle.

An additional embodiment of the device 102, including various alternative features thereof, is shown in FIGS. 5-10. In general, device 102, is similar in structure and operation to device 2, described above and includes a sifter unit 104 having a housing 146 defining an open upper side 148 and a lower side 150 opposite the upper side 148. The housing 146 is structured to define a mount portion 106 extending outwardly from the housing 146 along a first axis 152. The sifter unit 104 also includes a sifter basket 120 having an interior 154 aligned with and inset within the open upper side 150. Device 102 also includes a scale assembly 110 having a body 156 defining an upper opening 158 and an opposite lower opening 160 and having an annular weight-sensing unit 162 surrounding the upper opening 158. The body 156 of the scale assembly 110 is positionable on the housing 146 of the sifter unit 104 with the lower opening 160 in communication with the open upper side 148 of the housing 146 and a hopper 112 positionable on the weight-sensing unit 162.

Figure 5:
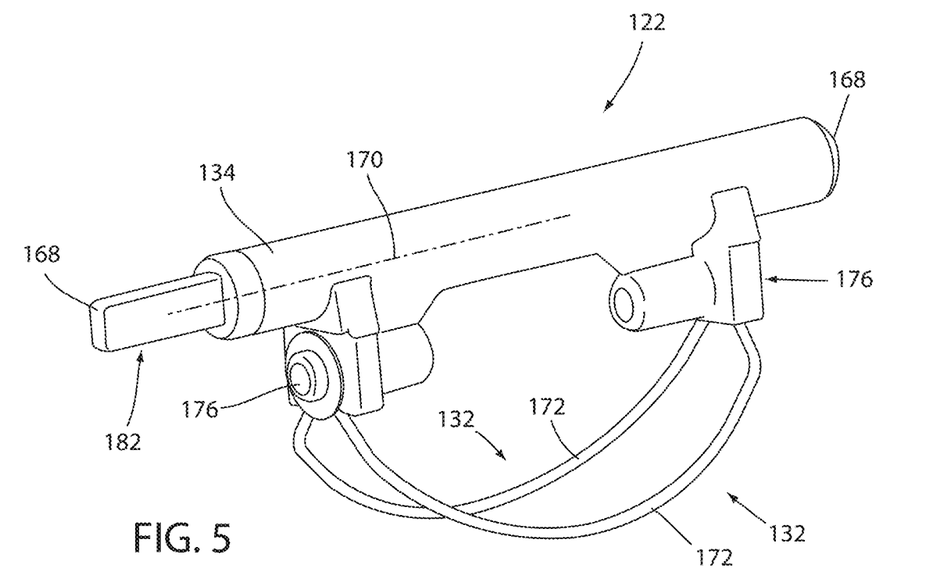
FIG. 5 is a perspective view of an alternative sweeper crank usable in a variation of a combined sifter and scale device.
Figure 6:
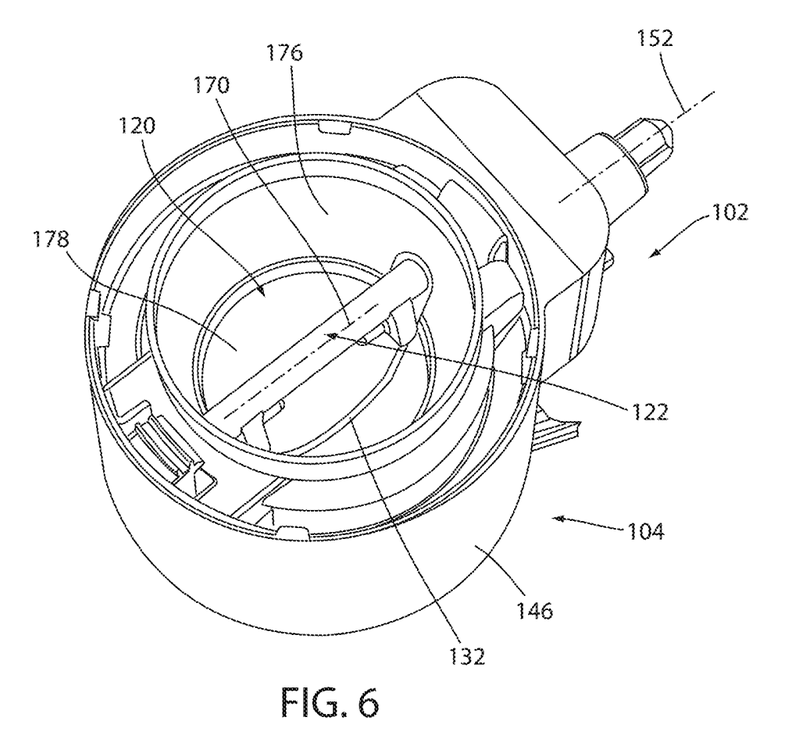
FIG. 6 is a housing of a sifter portion of the variation of the combined sifter and scale device.

As shown in FIGS. 5 and 6, sweeper crank 122 includes two arcuate wires 132 supported on an axial body 134 in an angularly-spaced manner with respect to each other. Wires 132 can be affixed with body 134 at common points 176 offset from the axis 170 of rotation of body 134 and can extend from points 176 at an angle of between 10° and 45° with respect to each other. The sweeper crank 122 is rotated in an oscillating manner with respect to the sifter basket 120 by a cam mechanism 183 that converts the continuous rotational movement of the input shaft 108 to the desired oscillating movement. The amount of rotation of crank 122 for each oscillation can vary depending, for example, on the spacing of wires 132 such that the sweeper crank traverses sifter basket 120 fully with each oscillation. In particular, in the illustrated arrangement, each of the wires 132 traverses a respective portion of the sifter basket 120 that is less than the entire basket by the angle between the wires 132 with the portions traversed by the respective wires 132 overlapping such that the entire sifter basket 120 is traversed by at least one of the wires 132. Sifter basket 120 may include a solid upper portion 178 that surrounds and extends upwardly from a mesh portion 180 of basket 120. As shown, sweeper crank 122 can be mounted within upper portion 178.

Figure 7:
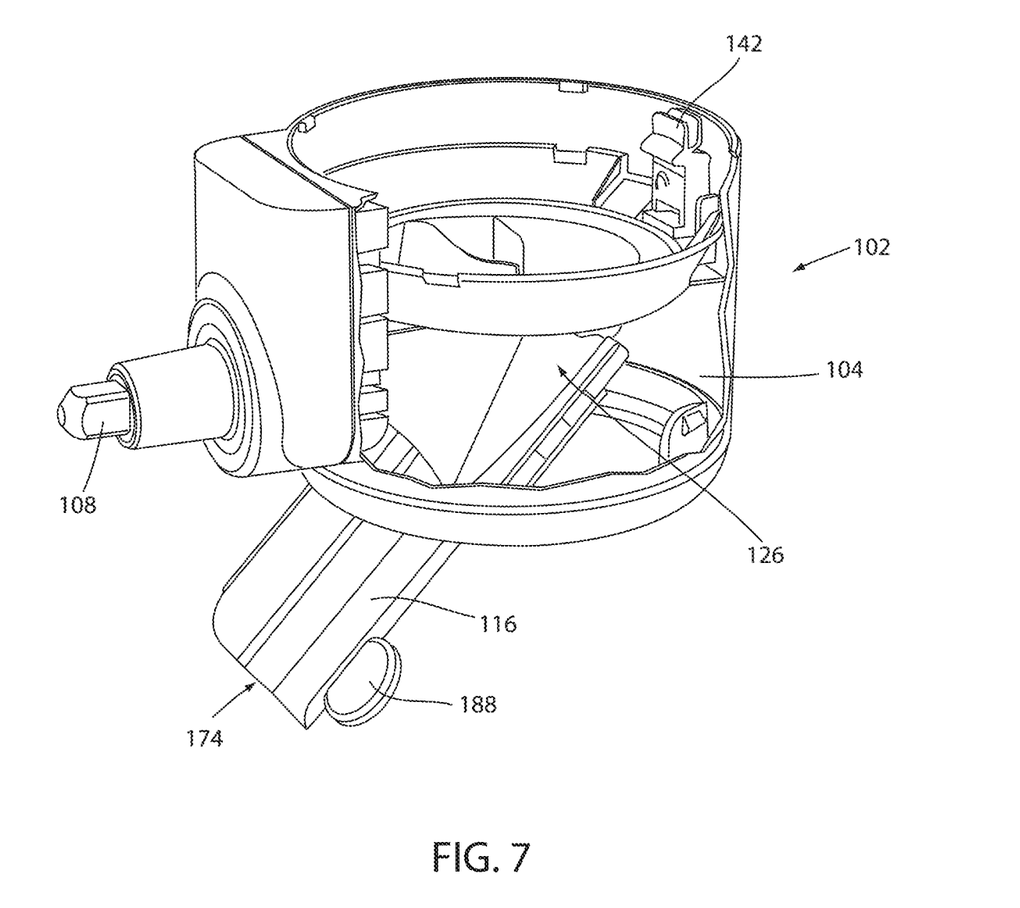
FIG. 7 is a perspective view of the sifter portion of FIG. 6 showing an output chute thereof.
Figure 8:
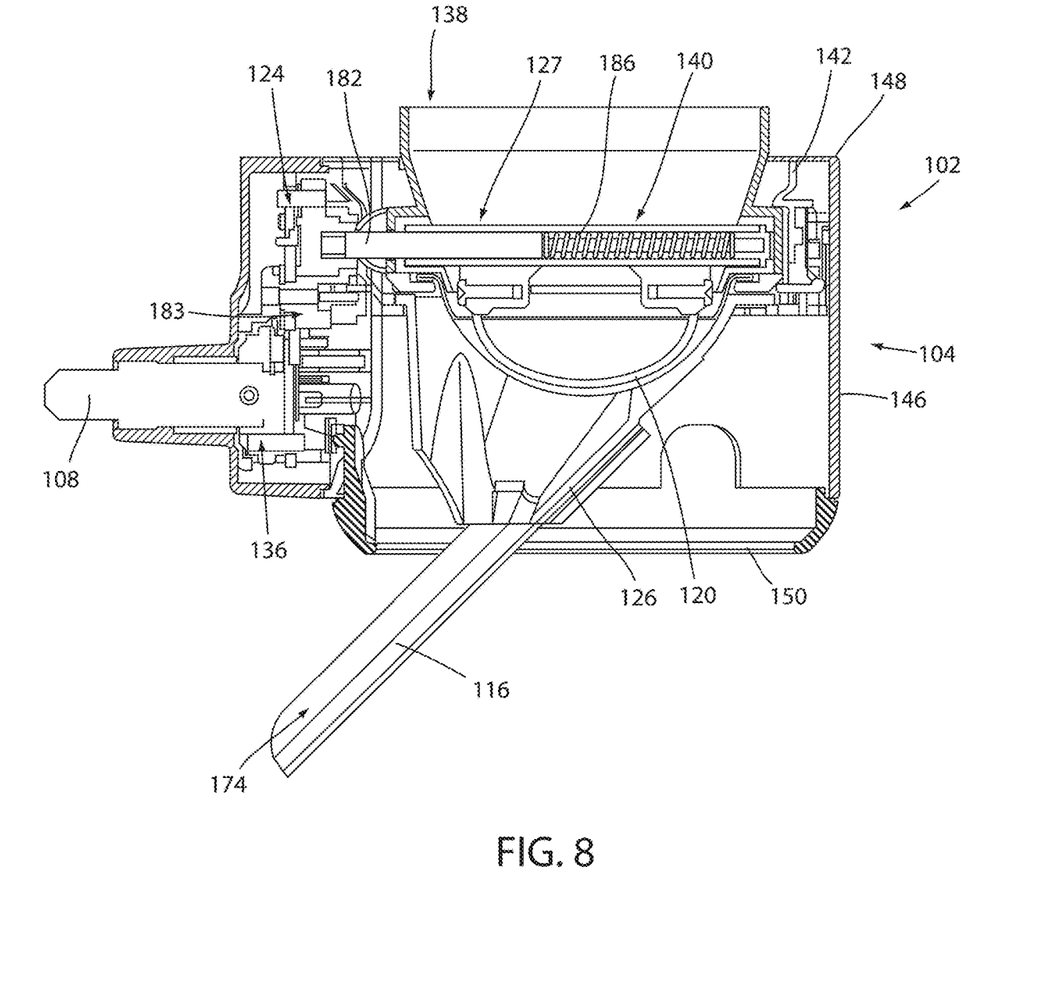
FIG. 8 is a side cross-section view of the sifter portion of FIG. 6 showing internal features thereof.

As shown in FIGS. 7 and 8, the mounting of sweeper crank 122 with upper solid portion 178 of sifter basket 120 can facilitate configuration of sifter portion 104 with a removable sifter assembly 138 by which the sifter basket 120 and sweeper crank 122 collectively are removable from housing 104 by way of a spring loaded drive shaft 140 and a clip 142. This arrangement allows the scale 110 to be used in connection with chute 116 for large ingredients that do not require sifting, with ingredients dispensed from hopper 112 passing directly through the housing 146 of sifter portion 104 and into chute 116. In particular, sweeper crank 122 is rotatably coupled at the ends 168 thereof with the sifter basket 122. Sweeper crank 122 further includes an input end 182 operably coupleable with an output 184 mounted on an interior of the housing 146 and rotationally driven by the input shaft 108. Input end 182 is biased outwardly with respect to sifter basket 120 by a spring 186 internal to body 136. In this manner, sifter assembly 138 can be assembled with housing 146 by aligning input end 182 with output 184 and pressed inwardly until sifter basket 120 can be lowered into housing 146, at which point an outer periphery of upper solid portion 178 can be secured within clip 142.

Figure 9:
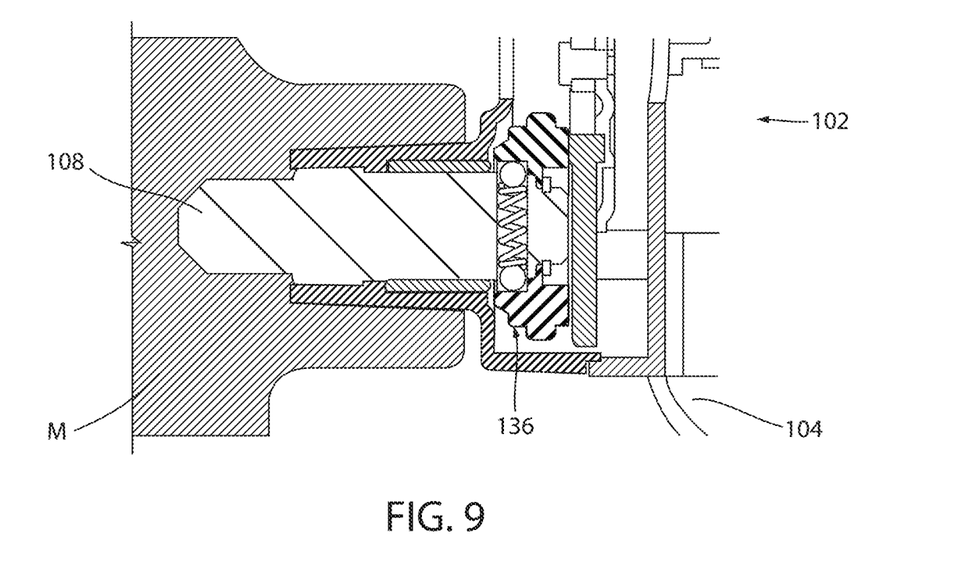
FIG. 9 is a side cross-section detail view of the sifter portion of FIG. 6 showing a clutch mechanism included therein.

As shown in FIG. 9, device 2 also includes a clutch assembly 136 coupled between the input shaft 108 and the sweeper crank 122 (including between input shaft 108 and output 184). The clutch assembly 136 shown in the example is a ball-and-spring design that is automatically resettable and prevents damage to the sifter portion 104 of device 102 (including sweeper crank 122 and or reduction mechanism 124), if the sweeper crank 122 is jammed by a foreign or other large object in the sifter basket 120. Other types of clutch assemblies may be substituted.

Returning to FIG. 8, chute 116 of device 102 can be mounted in a telescoping manner (rather than the previously-disclosed upwardly-pivoting arrangement). As discussed above, chute 116 is rotatably coupled with housing 146 (in a plane parallel with the counter) by way of a mounting unit 126. As further shown, chute 116 is coupled with mounting unit 126 in a sliding manner. As above, chute 116 defines the conduit 174 of the relative extension thereof allowing vertical movement and/or extension of chute 116 to accommodate bowls B or other receptacles of different heights and to facilitate movement into and out of the desired bowl B or receptacle. Chute 116 may further include a tab 188 for gripping to facilitate movement thereof with respect to mounting unit 126, as well as rotation of chute 116.

Figure 10:
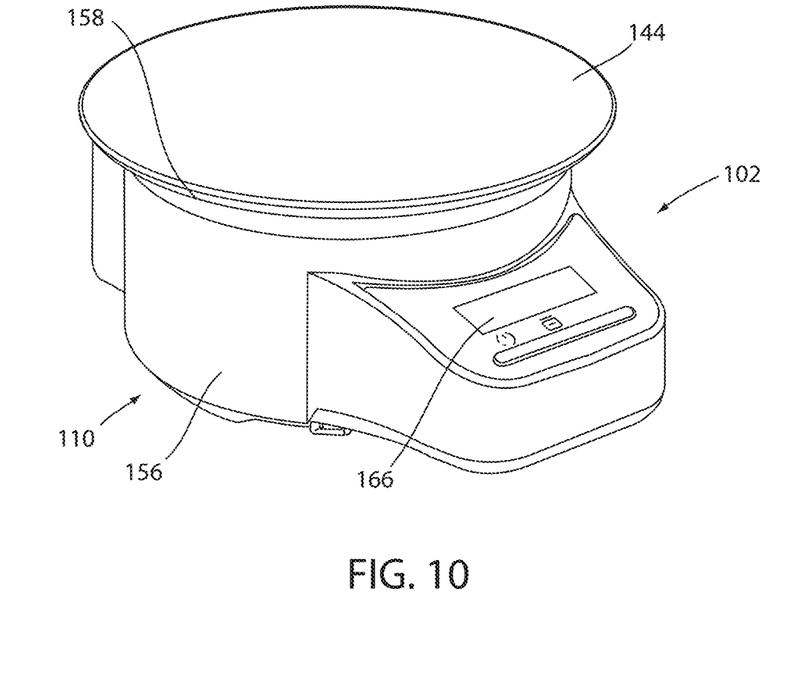
FIG. 10 is a perspective view of a scale portion of the variation of the combined sifter and scale device in use with a weight plate as a stand-alone scale.

As shown in FIG. 10, an auxiliary weight plate 144 can be included with device 102.

Weight plate 144 can be configured to mount to the scale assembly 110 in place of the hopper 112. This mounting may be done by including a mounting portion on the underside of weight plate 144 that is similar to the lower portion of hopper 112, including the above described lower end 64 thereof to rest on the above-described weight sensing unit 62 of scale assembly 110. As discussed above, because, scale assembly 110 is powered separately from sifter unit 104, the scale 102 can be used separately therefrom. Accordingly, scale assembly 110 can be configured to be removed from sifter unit 104 and positioned on a countertop. Similarly, hopper 112 can be removed and replaced with weight plate 144 so that scale assembly 110 can be used as a stand-alone kitchen scale, when the remainder of device 102 is out of use.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A food-product handling device, comprising:
a housing defining an open upper side, a mount extending outwardly from a first housing along a first axis, and a lower side opposite the open upper side;
a sifter basket having an interior aligned with and inset within the open upper side;
at least one weight sensor operably supported on the housing over the open upper side of the housing; and
a hopper defining a lower open end mountable over the housing with at least a portion of the lower open end bearing on the at least one weight sensor and with the lower open end in communication with the open upper side of the housing.

2. The device of claim 1, wherein the hopper includes a butterfly valve rotatably mounted within the lower open end to selectively open and close the lower open end.

3. The device of claim 1, wherein the mount is configured to couple the device to a motor-driven mixing device and support the device on the motor-driven mixing device.

4. The device of claim 1, further including a sweeper crank unit mounted within the housing, having an arm generally following a contour of a cross-section of the sifter basket and being rotationally coupled with a fitting extending from the mount of the housing, the fitting being configured for coupling with a drive port of the motor-driven mixing device for the device to drive rotation of the arm.

5. The device of claim 4, wherein the housing encloses a clutch mechanism disposed between the fitting and the arm.

6. The device of claim 4, wherein the sweeper crank unit further includes a cam mechanism including a cam rotationally driven by the fitting and operatively engaged with an input element to translate continuous rotation of the cam into oscillating rotation of the arm.

7. The device of claim 1, further including a chute extending from the lower side of the housing, the chute defining a conduit from an interior of the housing below the sifter basket to a location external to the housing.

8. The device of claim 1, wherein:
the weight sensor is included in a scale assembly including a body defining an upper opening and an opposite lower opening and having the weight sensor mounted on a periphery of the upper opening, the body being positionable on the housing with the upper opening in communication with the open upper side of the housing; and
the scale assembly is removable from the body and is configured for resting on a flat surface, the device further including a plate positionable over the upper opening of the body in place of the hopper and bearing on the at least one weight sensor.

9. A food-product handling device, comprising:
a housing defining an open upper side, a mount extending outwardly from the housing along a first axis, and a lower side opposite the upper side;
at least one weight sensor operably supported on the housing over the upper side of the housing;
a hopper defining a lower open end mountable over the housing with at least a portion of the lower open end bearing on the at least one weight sensor and with the lower open end in communication with the open upper side of the housing; and
a chute extending from the lower side of the housing, the chute defining a conduit from an interior of the housing to a location external to the housing.

10. The device of claim 9, wherein the hopper includes a butterfly valve rotatably mounted within the lower open end to selectively close the lower open end to retain products within the hopper for determining a weight thereof by way of the weight sensor.

11. The device of claim 9, wherein the chute is coupled with the housing by a conical mounting unit pivotably disposed within the housing beneath the sifter basket.

12. The device of claim 9, wherein the chute further includes a body rotatably coupled with the mounting unit in a plane perpendicular to a plane of rotation of the mounting unit.

13. The device of claim 9, wherein the chute includes a body defining a first portion of the conduit and an extension portion slidably coupled with the body and defining a second portion of the conduit that varies in a length thereof within sliding of the extension portion relative to the body.

14. The device of claim 9, wherein the mount is configured to support the device with respect to a motor driven device.

15. The device of claim 14, further including:
a sifter basket having an interior aligned with and inset within the open upper side of the housing, the lower end of the hopper being in communication with the interior of the sifter basket; and
a sweeper crank unit mounted within the housing, having a first arm generally following a contour of a cross-section of the sifter basket and being rotationally coupled with a fitting extending from the mount of the housing;
wherein the fitting is configured for coupling with a drive port of the motor driven device for the device to drive rotation of the first arm.

16. The device of claim 15, wherein the sweeper crank unit further has a second arm coupled with the first arm at the fitting, the first and second arms extending angularly away from each other away from the fitting.

17. A food product handling device, comprising:
a sifter-unit housing defining an open upper side, a lower side opposite the upper side, and a mount extending outwardly from the first housing along a first axis, the mount being configured to couple the device to a motor-driven mixing device and support the device on the motor-driven mixing device;
a sifter basket having an interior aligned with and inset within the open upper side; and
a sweeper crank unit mounted within the housing, having a first arm and a second arm, each generally following a contour of a cross-section of the sifter basket and being rotationally coupled with a fitting extending from the mount of the housing, the second arm being coupled with the first arm at the fitting, and the first and second arms extending angularly away from each other away from the fitting such that the sweeper crank unit traverses the sifter basket fully by way of an oscillatory movement of the sweeper crank, with each of the first arm and second arm traversing a portion of the sifter basket that is less than an entirety thereof with a single oscillation of the oscillatory movement.

18. The device of claim 17, wherein:
the fitting is configured for coupling with a drive port of the motor-driven mixing device for the device to drive rotation of the sweeper crank unit; and the sifter-unit housing includes a cam mechanism configured to convert rotation of the fitting to the oscillatory movement of the sweeper crank.

19. The device of claim 17, wherein the sifter-unit housing further defines a lower open end, the device further comprising:
a chute extending from the lower open end of the sifter-unit housing, the chute defining a conduit from an interior of the housing below the sifter basket to a location external to the sifter-unit housing.

20. The device of claim 17, wherein the portion of the sifter basket respectively traversed by each arm of the sweeper crank unit is less than the entirety of the sifter basket by angle of between about 10° and 45°.

\* \* \* \* \*